United States Patent
Irwin et al.

(10) Patent No.: US 8,302,130 B2
(45) Date of Patent: Oct. 30, 2012

(54) DIGITAL TV SCANNING OPTIMIZATION

(75) Inventors: Paul Michael Irwin, Greystones (IE); Hans Peter Hess, Dublin (IE); Lorcan Mooney, Redmond, WA (US); Renaud Bordelet, Dublin (IE)

(73) Assignee: Microsoft Corporation, Redmond, WA (US)

( * ) Notice: Subject to any disclaimer, the term of this patent is extended or adjusted under 35 U.S.C. 154(b) by 787 days.

(21) Appl. No.: 12/116,110

(22) Filed: May 6, 2008

(65) Prior Publication Data
US 2009/0282439 A1    Nov. 12, 2009

(51) Int. Cl.
G06F 3/00 (2006.01)
G06F 13/00 (2006.01)
H04N 5/445 (2006.01)

(52) U.S. Cl. .................. 725/50; 725/54; 725/9; 725/14; 370/464

(58) Field of Classification Search .................. None
See application file for complete search history.

(56) References Cited

U.S. PATENT DOCUMENTS

| | | | |
|---|---|---|---|
| 5,737,028 A | 4/1998 | Bertram et al. | |
| 5,877,822 A | 3/1999 | Tazine et al. | |
| 6,118,498 A | 9/2000 | Reitmeier | |
| 6,470,497 B1 | 10/2002 | Ellis et al. | |
| 6,927,806 B2 | 8/2005 | Chan | |
| 6,978,471 B1* | 12/2005 | Klopfenstein | 725/50 |
| 7,177,640 B2 | 2/2007 | Lee | |
| 2003/0167174 A1* | 9/2003 | Dagtas et al. | 704/275 |
| 2005/0149965 A1* | 7/2005 | Neogi | 725/14 |
| 2006/0225109 A1 | 10/2006 | Seo | |
| 2006/0236332 A1* | 10/2006 | Kurose | 725/13 |
| 2007/0016932 A1 | 1/2007 | Franken et al. | |
| 2007/0067816 A1 | 3/2007 | Van Horck et al. | |
| 2007/0222900 A1 | 9/2007 | Yamaguchi et al. | |
| 2007/0277220 A1* | 11/2007 | Shikuma et al. | 725/139 |
| 2007/0300265 A1* | 12/2007 | Karkkainen | 725/62 |
| 2009/0144777 A1* | 6/2009 | Mikami et al. | 725/50 |
| 2009/0172720 A1* | 7/2009 | Kiiskinen et al. | 725/9 |

OTHER PUBLICATIONS

Digital TV Receiver, Electronics Information Online, Dec. 19, 2006, Copyright 2007 Electronics-Manufacturers, http://www.electronics-manufacturers.com/info/video-equipment/digital-tv-receiver.html.
Andrei Gorine, Programming Guide Manages Neworked Digital TV, EE Times, Dec. 2, 2002, http://www.eetimes.com/story/OEG20021127S0035.

* cited by examiner

*Primary Examiner* — Joshua Taylor
(74) *Attorney, Agent, or Firm* — Vierra Magen Marcus & DeNiro LLP (57) ABSTRACT

Optimized scanning for EPG data in the streams is provided by performing interim scans based on user data. The user data is gathered based on services accessed by one or more users of the device. The streams are then ranked according to the data and a scan threshold of a subset of streams to scan is defined. A interim scan occurs on a subset of streams up to the threshold streams after a first time interval after which scanning may end.

17 Claims, 5 Drawing Sheets

| Channel Rank | Channel | Stream | Stream Rank | Total Time on Channel (Cumulative) | Total Time on Stream |
|---|---|---|---|---|---|
| 1 | HBO | 3 | 2 | 14:30 | 17:05 |
| 2 | SHO 1 | 2 | 1 | 12:35 | 17:40 |
| 3 | DISNEY | 1 | 3 | 4:05 | 4:05 |
| 4 | Bravo | 4 | 4 | 3:08 | 3:08 |
| 5 | Local 2 | 2 | 1 | 3:05 | 17:40 |
| 6 | Spike | 3 | 2 | 2:35 | 17:05 |
| 7 | Local 3 | 2 | 1 | 2:00 | 17:40 |
| | | | | | |
| | | | | | |

DIGITAL TV SCANNING OPTIMIZATION

BACKGROUND

The television viewing experience has been enhanced in recent years through the ability of providers to provide additional information to the viewer. An electronic program guide information (EPG) allows a user to easily identify upcoming programming, provides additional information about programming and allows a user to accomplish additional tasks such as setting a recording time. EPG data is typically transmitted in band or out of band with the distribution mechanism of the service.

Entertainment services, including broadcast television, audio programming and data, may be provided to users using one of a number of digital transmission schemes. Digital Video Broadcasting (DVB) is a set of standards that define digital broadcasting using existing satellite, cable, and terrestrial infrastructures. There are several types of transport schemes, including transport satellite (DVB-S, DVB-S2 and DVB-SH); cable (DVB-C); terrestrial television (DVB-T, DVB-T2) and digital terrestrial television for handhelds (DVB-H). Integrated Services Digital Broadcasting (ISDB) is the digital television and digital radio format that Japan has created to allow radio and television stations there to convert to digital. ATSC is a digital television format which will replace the analog NTSC system in the United States.

In each of these transportation systems, each digital transport stream typically contains multiple services or channels, and also carry the associated EPG data. Digital receivers which receive, decode and output these services to a video or audio equipment need to scan available streams on a regular basis to keep EPG data up to date. A full scan on all transponders or multiplexes can take minutes for a DVB-T receiver but can take much longer for other receivers such as ISDB-T and DVB-S. In the case of DVB-S a scan algorithm may take several hours to complete.

When a Digital TV service list and the program guide are out of date, they adversely impact the end user experience.

SUMMARY

Technology is disclosed for optimizing scanning for electronic program guide data for services provided in a digital transmission system. A number of services such as broadcast video may be provided in each of a number of digital broadcast streams to a digital receiving device. The method optimizes scanning for EPG data in the streams by performing an initial scan on each of the plurality of digital data streams in a predetermined order. Next, user data is gathered based on services accessed by one or more users of the device. The streams are then ranked according to the data and a scan threshold of a subset of streams to scan is defined. A periodic scan occurs on a subset of streams up to the threshold streams after a first time interval after which scanning may end.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology is provided which optimizes multi-stream scanning of program guide and service information for digital services provided to a user. Normally, a number of services such as broadcast video are provided in each of a number of digital broadcast streams to a digital receiving device. The technology uses an initial scan on each of the plurality of digital data streams in a predetermined order. An optimized periodic scan occurs at regular intervals and a full scan occurs after longer intervals in which the periodic scan has not occurred. The periodic and full scans are optimized using accumulated user viewing data a scan threshold of a subset of streams to scan.

As discussed herein, the optimization technology may be implemented on various types of hardware components. In one embodiment, the technology is implemented on a processing device dedicated to providing audio and video content from a digital data stream, such as a set top box. In an alternative embodiment, the technology is implemented on a multi-function processing device such as a personal computer. The technology is operational with numerous other general purpose or special purpose computing system environments or configurations. Examples of well known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

It should be appreciated that the systems and methods of the present technology are described below with reference to block diagrams and flowchart illustrations of systems, methods, apparatuses and computer program. These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Figure 1:
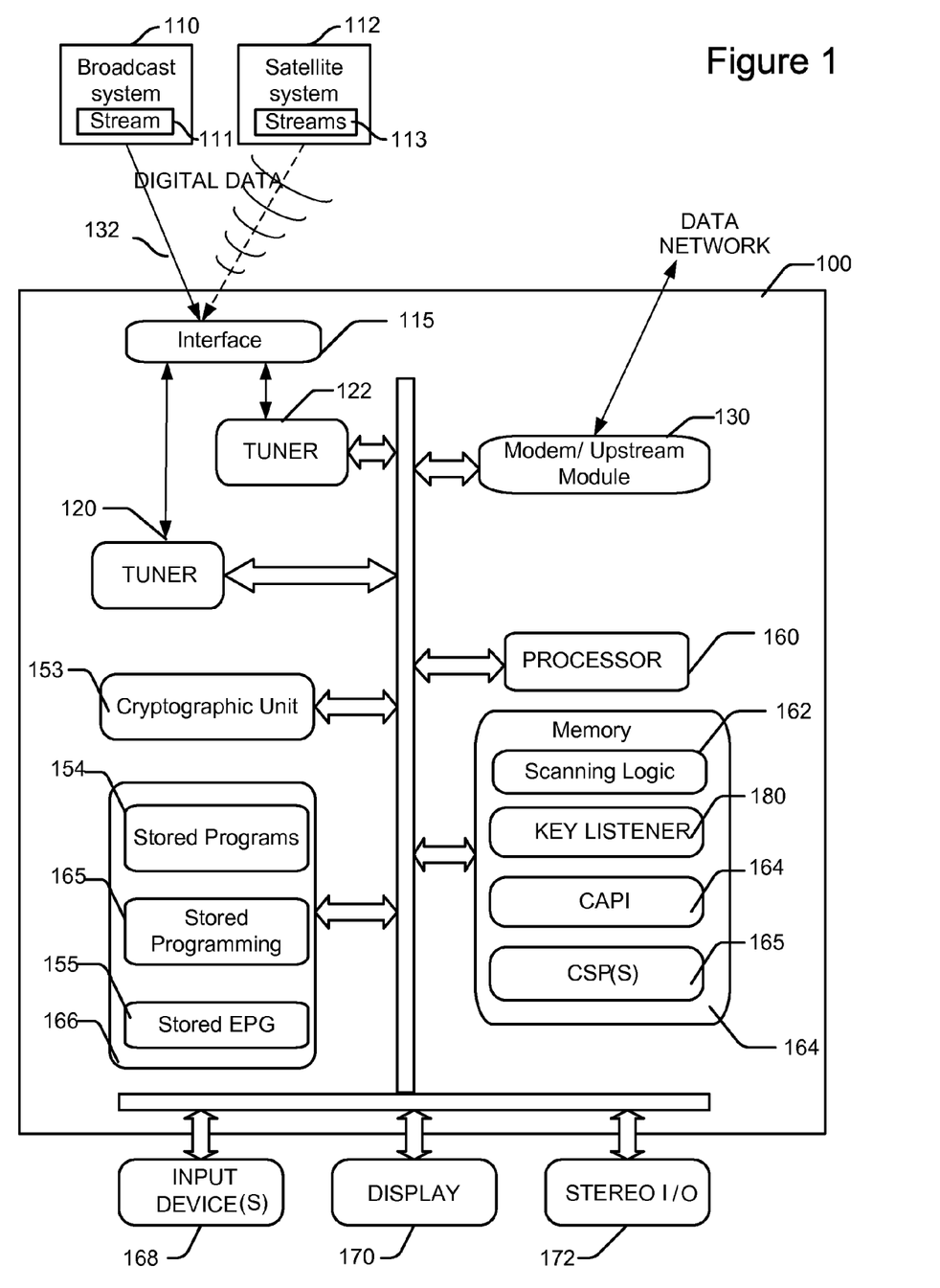
FIG. 1 depicts a typical set top box coupled to one or more digital transmission streams.

FIG. 1 shows an exemplary configuration of specialized processing device or digital receiver 100 coupled to receive digital programming services from transmission systems such as a broadcast system 110 or a satellite system. 112. Device 100 includes a central processing unit 160, volatile memory 164 (e.g., RAM), and non-volatile memory 166 (e.g., ROM, Flash, disk drive, floppy disk drive, CD-ROM, etc.). The device 100 has one or more input devices 168 (e.g., keyboard, mouse, remote control etc.), one or more display outputs 170 and one or more audio I/O interfaces 172. The display outputs and I/O interfaces may be coupled to audio/video presentation equipment such as stereos and televisions.

Processor 160 operates to execute programs 154, stored in non-volatile memory 166 in volatile memory 162. Processor 160 may be directed to execute a television viewing application by a viewer when the viewer presses keys of a remote control associated with the device 100. Additional stored programs may implement how EPG data is displayed to the user, the scanning logic used to access the EPG data, a digital video recorder, access to dedicated on-demand programming, and other services.

Device 100 includes a data interface 115 which is coupled to a first tuner 120 and a second tuner 122. The interface 115 is capable of receiving information from various content provider such a broadcast receiver 110 or a satellite system 112, each of which provides multiple streams 111, 113, respectively, of digital services. The data may be provided in a format based on any number of the aforementioned digital video standards, and the interface 115 is configured to receive digital broadcast data in such format.

Tuners 120, 122, select one or more transmission channels which provide incoming data to processing hardware. Each tuner is generally capable of interpreting only one stream at a time. Hence, multiple tuners are often provided. However, more or fewer than two tuners may be used. Device 100 includes a modem or upstream communication module 130. In one embodiment, the module 130 is a modem provides dial-up access to a data network to provide a back channel or direct link to content servers or a service provider. In other implementations of an upstream communication module, the module 130 may comprise a network card, or an RF receiver, or other type of port/receiver which provides access to back channel communications.

Device 100 runs an operating system which supports multiple applications. The operating system is preferably a multitasking operating system which allows simultaneous execution of multiple applications.

Non-volatile memory 166 may include stored computer programs 154, stored service programming 165, and stored EPG information 155. Stored programs may include at least those shown as active in system memory 164 in FIG. 1 as well as other programs. In one embodiment, cryptographic services may be implemented through a combination of hardware and software. A number of programs may be included in non-volatile memory including a key listener 180 to receive authorization and session keys transmitted from the server.

The keys received by listener 180 are used by the cryptographic security unit 153 to enable decryption of session keys and data. The cryptographic unit may comprise a secure, tamper-resistant hardware unit 153 provided external to the CPU 160 which facilitates cryptographic services in the device 100.

Additional software modules include a cryptographic application program interface (CAPI) 164 which provides functionality to any application seeking cryptographic services (e.g., encryption, decryption, signing, or verification). One or more cryptographic service providers (CSPs) 165 implement the functionality presented by the CAPI to the application. The CAPI layer 164 selects the appropriate CSP for performing the requested cryptographic function. The CSPs 165 perform various cryptographic functions such as encryption key management, encryption/decryption services, hashing routines, digital signing, and authentication tasks in conjunction with the cryptographic unit 153. A different CSP might be configured to handle specific functions, such as encryption, decryption, signing, etc., although a single CSP can be implemented to handle them all. The CSPs 165 can be implemented as dynamic linked libraries (DLLs) that are loaded on demand by the CAPI, and which can then be called by an application through the CAPI 164.

Also shown in FIG. 1 is scanning logic 162 which performs the EPG scanning functions described below.

Figure 2:
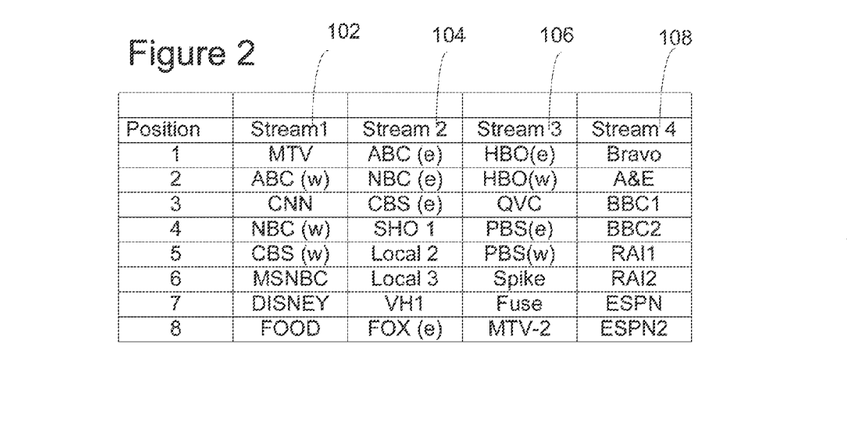
FIG. 2 depicts a listing of digital transport streams and the services carried on each stream.

FIG. 2 illustrates a number of digital streams 102, 104, 106, 108 which may be provided to an interface 115 such as that shown in FIG. 1. As shown in FIG. 2, each stream includes a number of different services in different positions in the stream. FIG. 2 shows an example of eight (8) digital services provided in each stream. Each service is provided at a different "position" in the stream. It will be understood that each channel and its associated data are broadcast continuously in a multiplexed fashion so that the positions illustrated in FIG. 2 are for illustration and description only. For example, stream 1 includes MTV, ABC(w), CNN, NBC(w), CBS(w), MSNBC, DISNEY and FOOD, while stream 2 includes ABC (e), NBC (e), CBS (e), SHO 1, Local 2, Local 3, VH1 and FOX (e). It should be understood that the services provided in each stream are exemplary and that the streams may include more or fewer services.

Each of the associated streams includes EPG data as well as the service data (such as television or audio programs) in the stream. When a change in the data occurs, service providers generally update the EPG data as well. This may occur intermittently or at regular intervals. In addition, a transmission provider may change services provided on a particular stream. This service data is updated in the scanning function along with the EPG data.

Figure 3:
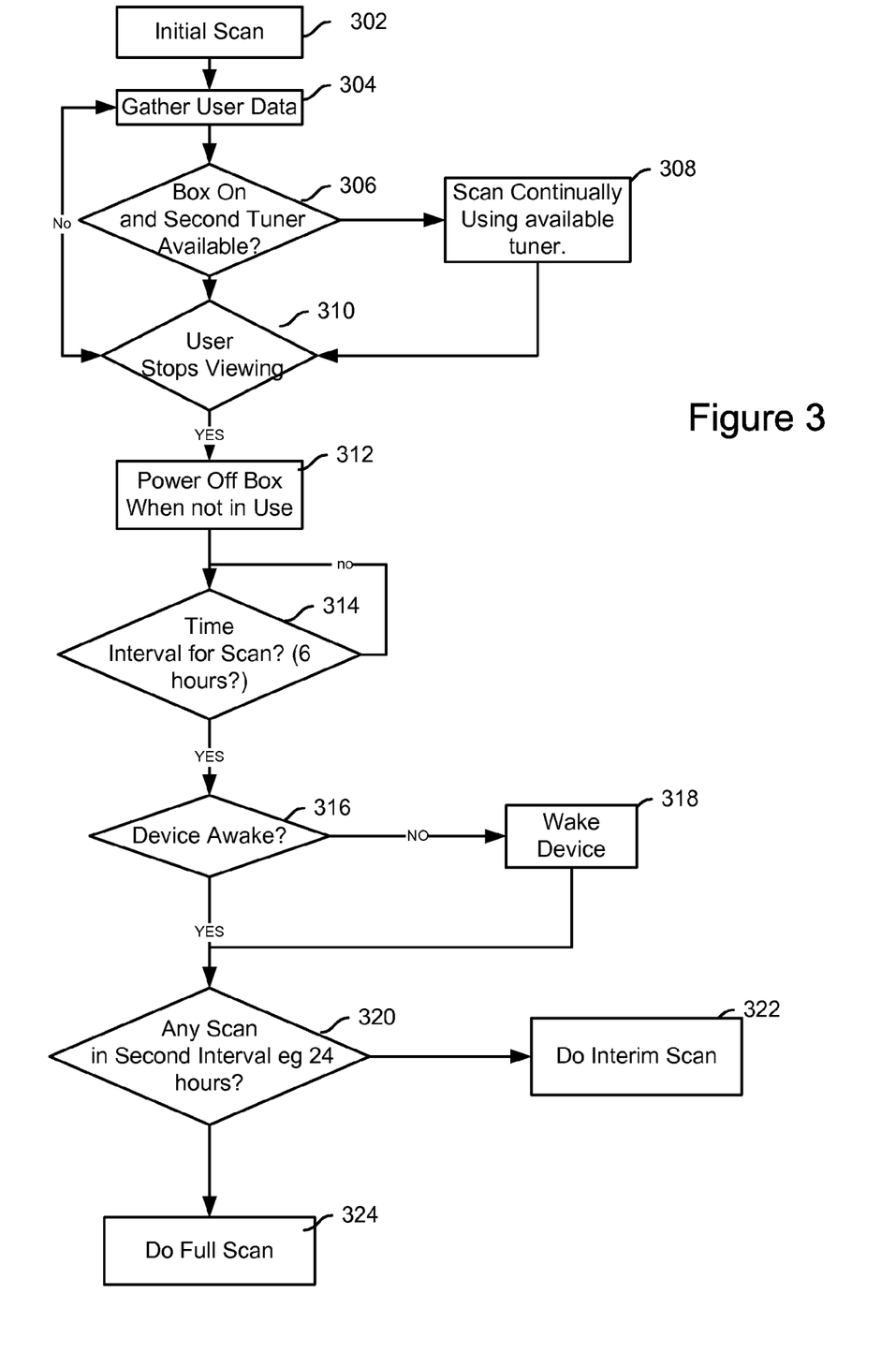
FIG. 3 is a flowchart depicting an operational method performed in accordance with the present technology.

FIG. 3 illustrates the scanning logic for optimizing the maintenance of EPG and service data. In accordance with the technology, an "initial" scan 302 occurs the first time a digital receiver is coupled to a data stream. Colloquially, this is referred to as a first time or "out of the box" scan and may occur when a device is moved from one transmission system to another, or more commonly, when the device is installed to a transmission system for the first time after being released by the manufacturer. Once the initial scan has been performed, the technology uses periodic scans to maintain the viability of the EPG data. As noted below, if a periodic scan has not occurred in a given amount of time, a full scan may occur.

Once a user device is coupled to the data stream, at step 302, a initial scan of available EPG data in the broadcast streams is performed. The initial scan may be performed in a number of ways. During the initial scan, the system will scan input streams based on a pre-determined order. In one embodiment, the pre-determined order may be one in which the popularity of channels specific to the location that the box is intended for use determines the scanning priority. In another embodiment, the pre-determined order may be a sequential scan of all available streams in the data. A method for performing an initial scan 302, as well as a periodic scan (step 322) and full scan (step 324) is discussed with respect to FIG. 4.

Figure 5:
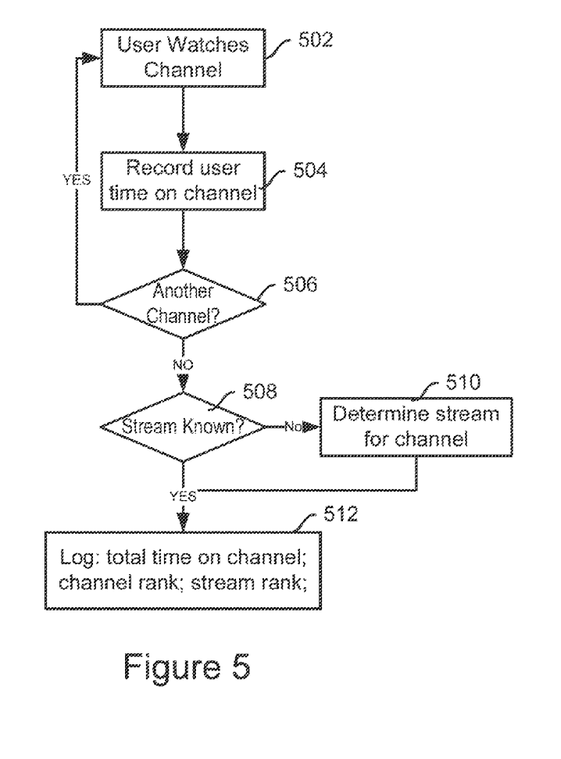
FIG. 5 is a flowchart depicting a method for obtaining user data for the digital transport streams available to a digital receiver.

At step 304, once the initial scan is complete, user data on the amount of viewing time one or more users spend on a channel is gathered and recorded. This process is illustrated in FIG. 5. Data may be gathered for a particular user or for the device as a whole, depending on whether the device is capable of distinguishing which user is viewing information on the device. For example, a windows based computer implementing a user login could retain data on each individual user while, in general, set top boxes do not distinguish between users. As explained below, user data is gathered continuously while information is being viewed on the device.

At step 306, a determination is made as to whether a second or additional tuner is available on the box. If the device is powered on and an available tuner is present, the scanning logic continually scans streams for updated EPG data. Hence, while a user is watching a channel using one tuner, the device seeks updated EPG and service data on another tuner.

Once a user stops viewing programming at step 310, the digital receiver is powered off at step 312. Typically, many digital receivers and computers appear powered off but in truth are not actually powered off. Many hardware devices such as those shown in FIGS. 1 and 7 feature advanced power management which allows the operating system to selectively control power by individual components. A number of power states are supported, with each state representing a different level of power, from fully powered up to completely powered down, with partial levels of power in each intermediate state. These states range from fully powered on and operational, to completely powered off. One intermediate state occurs when a system is in low power mode (a.k.a. sleep mode) where the CPU clock is stopped, but RAM is powered on and being refreshed, or power is removed from the CPU. Another intermediate state is when the system is suspended to RAM (a.k.a. standby mode) where most components are shutdown except RAM.

Typically, most set top boxes enter a partial powered down mode with reduced power consumption. However, even during this intermediate powered down mode, the devices are continually scanning for EPG data in the stream. In a completely powered down mode, a digital receiver operating the scanning technology will have a significant power savings over current devices.

At step 314, after a first time interval of, for example, six hours, a periodic scan will be performed. First, a check will be made at step 316 to determine whether the device is powered off or "awake". If the device is powered off, a wake-up function will be performed at step 318. Once the device is awake, a determination is made at step 320 as to whether any scan has occurred within a second, longer interval, for example 24 hours at step 320. This is necessary because the power down condition may have occurred as a result of a power outage, or the system may have lost the data signal for a period of time longer than that use in the normal periodic scan time (step 314). If a periodic scan has occurred within the second interval of time, then a periodic scan is performed at step 322. If not, a full scan is performed at step 324.

Figure 4:
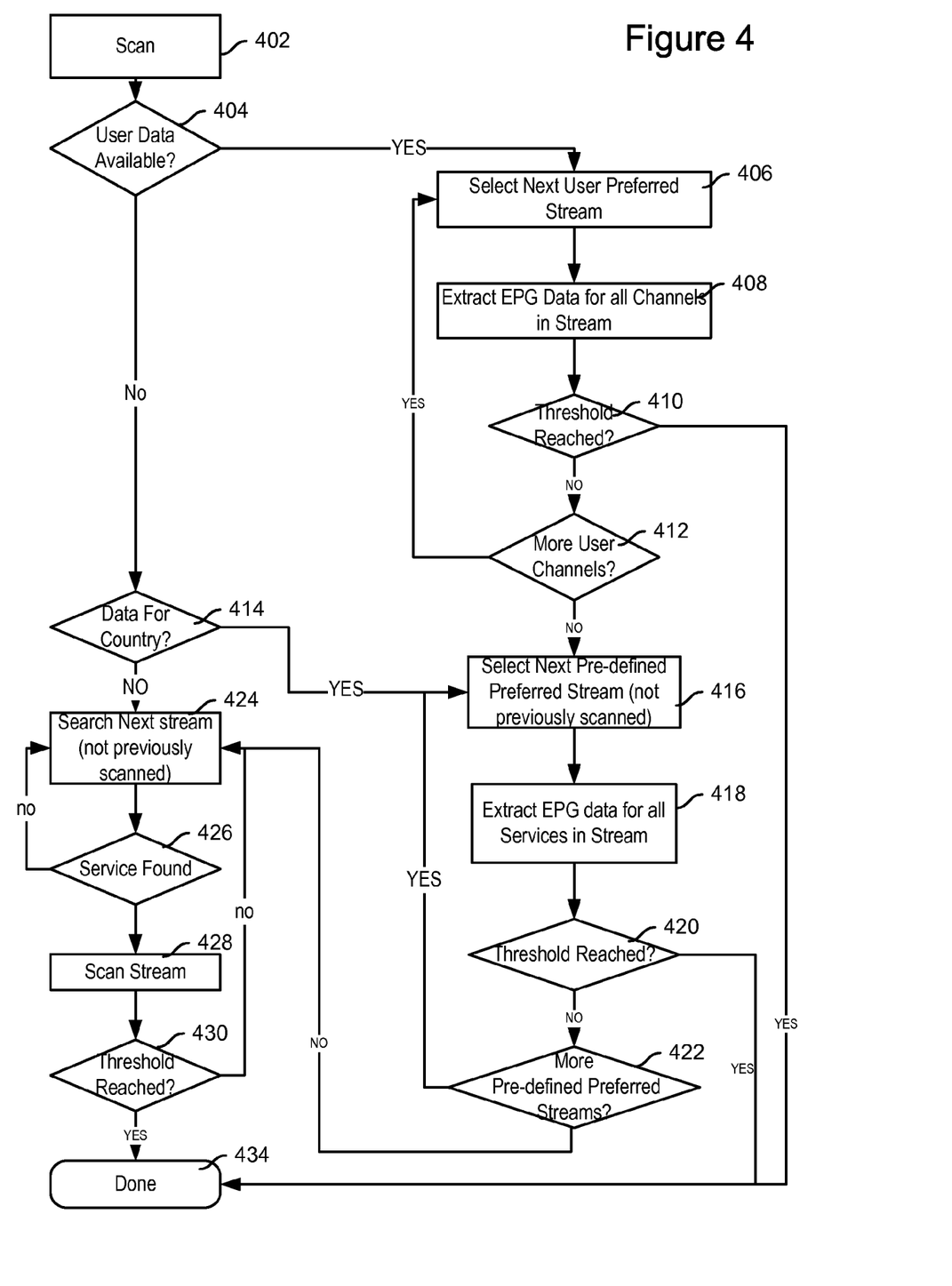
FIG. 4 is a flowchart depicting a scanning algorithm performed by the present technology.

FIG. 4 illustrates a process for performing an EPG/service data scan. FIG. 4 illustrates methodology which can be implemented for an initial scan, a full scan or a periodic scan. The difference between a periodic scan and an initial scan is the availability of user viewing data. The difference between a periodic scan and a full scan is the threshold number of streams scanned defining when an EPG scan is considered "complete."

At step 402 when a scan is initiated, a determination is made at step 404 as to whether user data is available. During an initial scan, no user data will be available (step 404) and the method will proceed directly to step 414. During an initial scan, stream or channel scan preferences for an initial scan or a full scan may be provided by the manufacturer. These preferences may be based on any pre-determined metric, such as known viewing preferences for channels or services in a particular country, or preferences of a transmission provider. This predetermined order may be defined by the manufacturer based on any metric or ordering. As used in FIG. 4, geographic data can include any predefined ordering implemented by a device manufacturer and included in a device, whether or not based on actual geographic preferences. If data is provided at step 414, the method will initially scan country data before sequentially examining each stream at steps 424-428 until a scanning threshold is reached.

A full scan may or may not include user data, while a periodic scan will likely include user data. Hence, for any scan, if user data is available at step 404, then at step 406, the next user preferred stream is selected at step 406. The user preferred stream is determined as discussed below in FIG. 5 from the user's channel viewing preferences. In general, the total time spent viewing a particular channel or service is logged, the stream or streams on which the channel is available is determined, and that stream maintained as a preference. The steps of logging and determining are performed continuously.

Once the user preferred stream is selected at step 406, then at step 408 the stream is scanned to extract all EPG and service data for all services available on that stream. Since streams generally contain multiple services, once the stream is tuned, the full contents of the EPG and service data on the stream are scanned before moving to the next stream. At step 410, a determination will be made as to whether the device has retrieved a sufficient amount of EPG data to render the EPG for the user. The threshold determination is made based on a number of factors, including whether the scan is an initial or full scan, the total number of channels available to the device, the number of streams available to the device, the storage capacity on the device allotted to EPG data and the user's viewing data. If the scan is a full scan (step 324), the determination at step 410 will be no. For example, the streams may include services for which the user does not subscribe or for which the user has never tuned to view. In this case, it is less likely that the user will require up to date information in the EPB for these streams. Hence, a determination may be made that the scan is sufficient for the purposes of updating the EPG data even if these un-subscribed or unviewed streams are omitted.

Note that step 410 can be omitted in an embodiment where scanning of all services that a user has previously viewed is desired.

If the threshold has not been reached at step 410, then at step 412, if additional channels are available, the method returns to step 406 to continue scanning user preferred streams.

If no additional user preferred channels are available at step 412 or if no user data is available (step 404) but country data is available (step 414) then the next preferred stream for a given country is selected at steep 415 and at step 418 EPG data for that stream is extracted. Once again, if a scanning threshold is reached at step 410, the scan can be completed before all possible streams available in the transmission system are scanned. Factors suitable for determining whether to end the scan prior to completion of all countries include whether the scan is an initial, full or interim scan, and whether certain countries are above a viewing level threshold for the country. If the scan is a full or initial scan, the answer at step 420 will be no. If the scan is an interim scan, for example, if certain services have a very low number of viewers, the choice may be made to exclude these services from an interim scan.

If the threshold is not reached at step 420, then at step 422, if there are additional predefined streams preferences available, the method returns to step 416. If no additional preferences are available, or if not data for the country was initially available, the method proceeds to step 424-430 to scan for all available streams in the distribution service. At step 424, the next available stream in the distribution service (not previously scanned at steps 408 or 416) is determined and once the next service on an un-scanned stream is found at step 426, the stream is scanned at step 428. A threshold may be implemented at step 430 to end scanning before all available streams in a distribution service are scanned. The threshold may be implemented in accordance with the foregoing discussion of available factors.

FIG. 5 illustrates a method for gathering user preference information. At step 514 a user views a particular channel and at step 502, the user's viewing time on that channel is monitored and recorded at step 504. If a user switches a channel at step 506, the new channel is recorded. While the user views the channel or subsequent to the user viewing, if the channel stream is not known at step 508, then a stream determination is made at step 510. Once a stream determination is made, the total time on the user has viewed the channel, the channel's rank and the stream rank is recorded.

Figure 6:
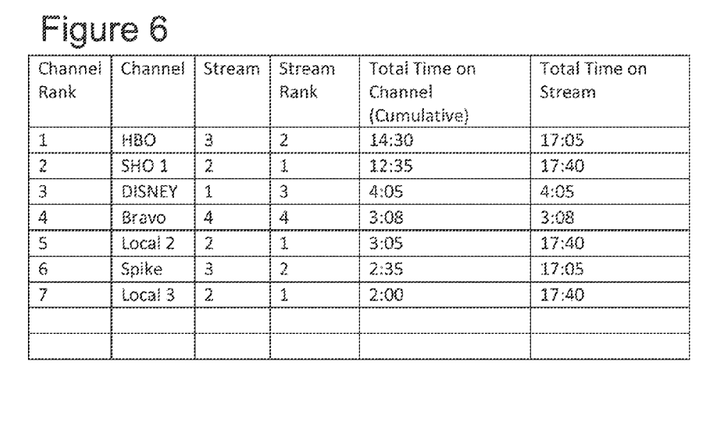
FIG. 6 is a table illustrating data records maintained in accordance with the present technology for ranking digital transport streams.

Note that the stream rank may be different than the channel rank. In one embodiment, scanning in accordance with steps 406 and 408 above occurs according to stream rather than channel ranking. In another embodiment, the channel rank determines priority of the stream rank. FIG. 6 represents a data sample for the data recorded at steps 502-506. In this example of FIG. 6, the user watches HBO more than other services. With reference to FIG. 2, HBO is provided on stream 3 (106). However the user also watches SHO, LOCAL 2 and LOCAL3 which are provided on stream 2. As such, the total time the user spends on STEAM 2 is greater than stream 3 and STREAM 2 has a higher ranking. In steps 406/408 above, STREAM 2 will be scanned first. In an alternative embodiment, stream 3 will be scanned first because the user's most viewed channel—in this example HBO—resides on this stream.

The aforementioned optimization technology allows for interim scanning of preferred streams based on user information and pre-defined streams, so that each scan likely obtains the information most likely needed by a user.

Figure 7:
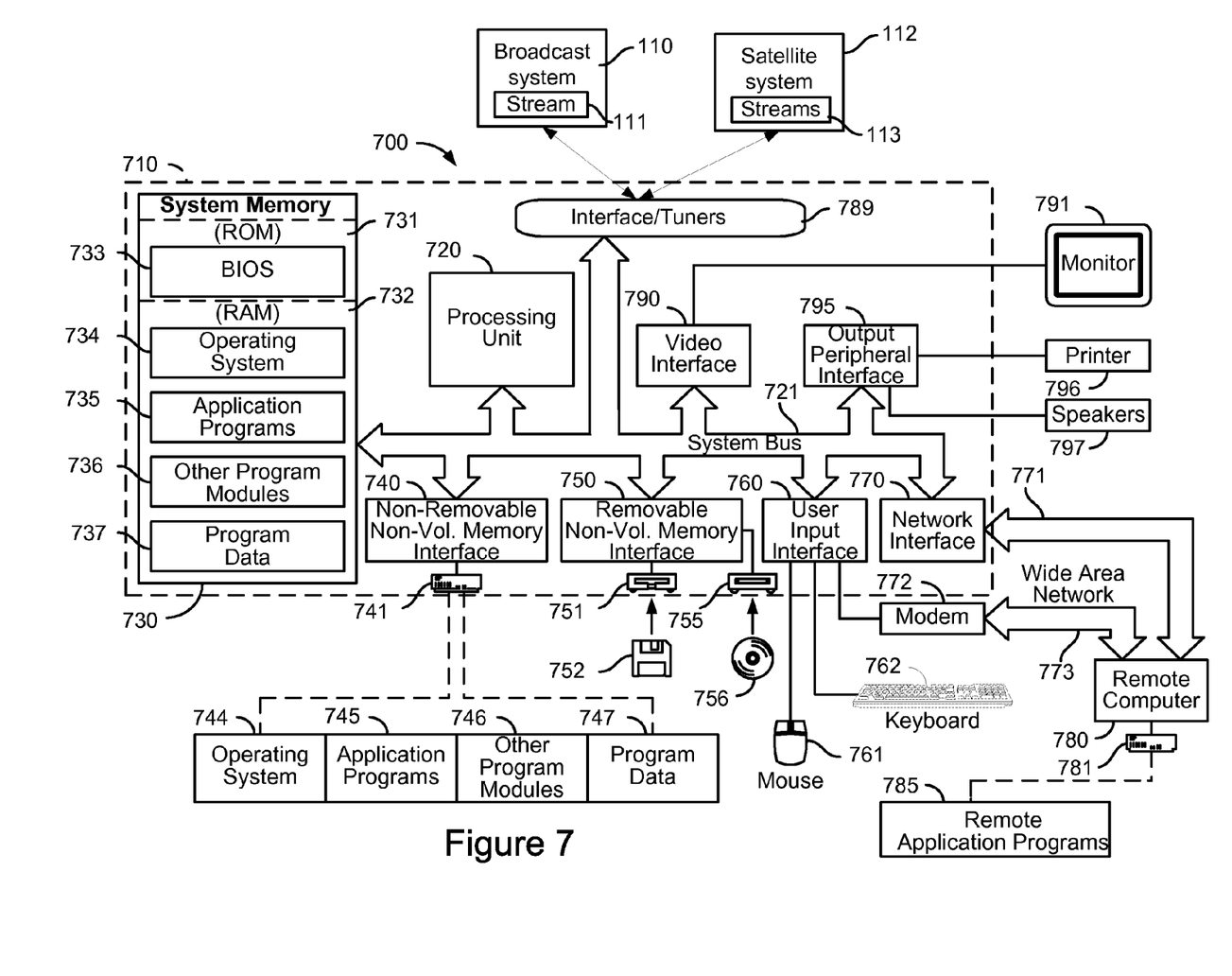
FIG. 7 illustrates an alternative processing device which may be utilized as a digital transport stream receiver.

As noted above, the aforementioned methods may be provided in a personal computer FIG. 7 illustrates an example of a suitable computing system environment 700 such as personal computer.

With reference to FIG. 7, an exemplary system for implementing the technology includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 includes an interface and tuner component 789 providing the functions described with respect to elements 115, 120, 122 in FIG. 1. This component may be integrated into computer 710 or may be provided in the form of a peripheral card.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 740 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through an non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 20 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through a output peripheral interface 790.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for maintaining an electronic program guide in a digital display device by scanning a plurality of digital transport streams, each digital transport stream including a plurality of services, comprising:
   scanning electronic program guide data in each of the plurality of digital transport streams, each of the plurality of digital transport streams including a plurality of entertainment services and electronic guide data for each of the entertainment services, in a first predetermined order based on data indicating viewing preferences for a geographical region;
   gathering user data based on services accessed by one or more users of the digital display device;
   ranking the plurality of digital transport streams according to said user data, said ranking including ordering the digital transport streams by greatest to least user service viewing time for entertainment services viewed by a user on each stream;
   re-scanning at least a first subset of the plurality of data streams in a second order based on the step of ranking.

2. The method of claim 1 wherein the step of re-scanning ends after a threshold number of streams has been scanned.

3. The method of claim 1 wherein the method includes completely powering off the display device after said step of re-scanning if a viewer is not viewing a service.

4. The method of claim 2 wherein the method further includes powering up the device from a powered off state prior to performing said step of rescanning.

5. The method of claim 2 wherein the threshold comprises at least one of: all streams a user has viewed; all streams a user has viewed and all streams in a pre-determined order; all streams a user has viewed, all streams in the pre-determined order and a subset of all remaining streams.

6. The method of claim 1 wherein a pre-determined order comprises a ranking of streams according to top rated channels viewed in a country.

7. The method of claim 1 wherein the second order comprises first scanning those streams having most user-viewed services, then scanning those streams having viewer preferences in the geographic region.

8. The method of claim 1 wherein the step of re-scanning occurs after a first time interval relative to the step of scanning and wherein the method further includes scanning each of the plurality of data streams beginning with the first subset in the second order followed by scanning streams not in the subset in the second order after a second time interval.

9. A method for scanning a plurality of digital transport streams for electronic program guide data, comprising:
   (a) performing an initial scan of a plurality of digital transport streams, each digital transport stream including a plurality of audio, visual or data services and electronic program guide data for said services, the initial scan comprising scanning electronic program guide data in each of the plurality of digital transport streams for each of the services in each of the plurality of digital data streams in a predetermined order;
   (b) gathering user data based on services accessed by one or more users of a digital display device;
   (c) ranking the plurality of data streams according to said user data, the ranking comprising determining the digital transport streams for each of the services viewed by a user, summing service viewing time for each digital transport streams and ordering the streams by greatest to least user service viewing time per stream;

(d) determining a scan threshold defining a first subset comprising less than all of the plurality of streams providing a number of services likely to be accessed by the user;

(e) after a first time interval, scanning at least the first subset of the plurality of data streams in a second order based on the step of ranking until a threshold number of streams has been scanned;

(f) after a second time interval and if step (e) has not occurred, scanning each of the plurality of data streams beginning with the first subset in the second order followed by scanning streams not in the subset in the second order.

10. The method of claim 9 wherein the second order comprises first scanning those streams having the most user-viewed services, then scanning those streams having viewer preferences in the geographic region.

11. The method of claim 10 wherein the threshold comprises at least one of: all streams a user has viewed; all streams a user has viewed and all streams in a pre-determined order; all streams a user has viewed, all streams in the pre-determined order and a subset of all remaining streams.

12. The method of claim 9 wherein the method includes setting the device in a completely powered down mode after said step of re-scanning if the viewer is not viewing a service.

13. The method of claim 12 wherein the method further includes continually scanning in said second order using a first available tuner while a viewer is accessing a service on a second available tuner.

14. A digital receiver comprising:
a processing device;
a digital data interface;
at least one tuner accessing a plurality of digital data streams each stream including a plurality of entertainment broadcast services and electronic program guide data for said services; and
a storage device including processor readable code to instruct the processing device to perform a method comprising:

scanning electronic program guide data for the plurality of services in each of the plurality of digital data streams, the scanning occurring in an order based on data indicating viewing preferences for a geographical region;

storing user data based on services viewed by one or more users of the digital display device;

ranking the plurality of data streams according to said user data, said ranking including ordering the digital transport streams by greatest to least user service viewing time for entertainment services viewed by a user on each stream;

determining a scan threshold defining a first subset comprising less than all of the plurality of streams providing a number of services likely to be accessed by the user;

after a first time interval, scanning at least the first subset of the plurality of data streams in a second order based on the step of ranking until a threshold number of streams has been scanned.

15. The receiver of claim 14 wherein the code instructs the processor to perform a method further comprising scanning each of the plurality of data streams beginning with the first subset in the second order followed by scanning streams not in the subset in the second order after a second time interval and if said step of scanning at least a first subset has not occurred.

16. The receiver of claim 14 wherein the second order comprises first scanning those streams having the most user-viewed services, then scanning those streams having viewer preferences in the geographic region.

17. The receiver of claim 14 wherein the step of scanning ends after a threshold number of streams has been scanned and wherein the threshold comprises at least one of: all streams a user has viewed; all streams a user has viewed and all streams in a pre-determined order; all streams a user has viewed, all streams in the pre-determined order and a subset of all remaining streams.

* * * * *